United States Patent [19]
Lovell et al.

[11] 3,856,741

[45] Dec. 24, 1974

[54] ADHESIVE FOR CONCRETE AND METHOD OF PREPARATION

[75] Inventors: John A. Lovell, Monroe Falls; Philip G. Harris, Akron, both of Ohio

[73] Assignee: The Goodyear Tire & Rubber Company, Akron, Ohio

[22] Filed: Jan. 8, 1971

[21] Appl. No.: 105,128

[52] U.S. Cl. ............................................. 260/37 N
[51] Int. Cl. ........................................... C08g 51/04
[58] Field of Search ................................. 260/37 N

[56] References Cited
UNITED STATES PATENTS

| | | | |
|---|---|---|---|
| 3,290,165 | 12/1966 | Iarnicelli | 260/37 N |
| 3,562,355 | 2/1971 | Holden | 260/37 N |
| 3,577,385 | 5/1971 | Feltzin et al. | 260/37 N |
| 3,579,482 | 5/1971 | Brotherton et al. | 260/37 N |
| 3,583,043 | 6/1971 | Weber et al. | 260/37 N |

OTHER PUBLICATIONS

SEALANTS, Damusis, Reinhold Publishing Company, 1967, pp. 142, 143 relied on.

*Primary Examiner*—Morris Liebman
*Assistant Examiner*—S. L. Fox
*Attorney, Agent, or Firm*—F. W. Brunner; J. D. Wolfe

[57] ABSTRACT

An adhesive or sealant composition of the polyurethane type containing white pigment capable of adhering to concrete under conditions of low temperature.

3 Claims, No Drawings

ADHESIVE FOR CONCRETE AND METHOD OF PREPARATION

This invention relates to a method for preparing an adhesive for concrete and to said adhesive.

In concrete road construction it is necessary to have joints at various places along the road to permit the concrete to expand and contract. These joints present problems and it is customary to seal the joints with various filler materials such as the bituminous joint sealer. Also, in concrete buildings or structures, joints are necessary and these are required to be sealed. In the construction wherein concrete blocks are utilized sealers are required.

The sealers heretofore available have exhibited a tendency to tear away from the concrete as the concrete is subjected to varying temperature conditions and thus permit air and other materials to penetrate into the joint. Especially was this a problem where the concrete was subjected to very cold temperatures and consequently an ASTM method has been developed for evaluating joint sealers. This method is identified as ASTM D-1191.

An object of this invention is to provide a method of preparing a concrete adhesive which is essentially free of solvent and which may be readily applied to give a satisfactory bond between the adhesive and the concrete.

In accordance with the object of this invention the adhesive is prepared by reacting a reactive hydrogen containing material of a suitable molecular weight with an organic polyisocyanate where the isocyanate functionality is preferably between 2 and 3. The reactive hydrogen containing material has incorporated therein a white pigment of the type hereinafter described in the ratios of at least 16 parts per hundred parts of reactive hydrogen containing material and sufficient to give the desired bond, depending on the molecular weight of the reactive hydrogen containing material. Usually at about 70 parts of white pigment per hundred parts of reactive hydrogen containing material the optimum loading effects are obtained and the detrimental effect of increasing the viscosity of the adhesive comes into play. Therefore it will be generally desirable to use at least 16 parts and sufficient to give the desired bond for the molecular weight of the reactive hydrogen containing material but no more than about 70 unless special precautions are taken to handle the more viscous adhesive that is obtained at the higher loadings.

In general it is desirable to use dry moisture free reactive hydrogen containing materials and to add the pigment to the reactive hydrogen containing material and allow it to be adequately mixed and dispersed therein before the organic polyisocyanate is added and allowed to react with the reactive hydrogen containing material to obtain a liquid prepolymer.

Any of the reactive hydrogen containing materials of approximately 1,000 molecular weight and containing 2 to 3 hydroxyls may be utilized in the production of these adhesives. It should be appreciated that if the molecular weight is too low, that is, less than about 1,800, the resulting cured adhesive may be relatively inelastic at the test temperatures set forth in ASTM method D-1191 and this can result in the concrete failing by the test specimen breaking, although the adhesive exhibits a satisfactory bond to the cement surface per se. Accordingly, it is preferred that where the adhesive is to be used to adhere concrete that is to be subjected to extremely low temperatures, the molecular weight be at least 2,000 and no more than about 6,000.

Representative of the many classes of reactive hydrogen containing materials are the polyester polyols, polyether polyols, and the hydrocarbon polyols. The preferred members of the polyether polyols are the alkylene oxide condensation products with a di- or trifunctional material where the alkylene oxide contains 3 to 4 carbon atoms. Representative members of this class of materials are the polypropylene ether glycols or triols and mixtures of these materials and the polytetramethylene ether glycol.

Representative hydrocarbon polyols are those obtained by the polymerization of diolefins of 4 to about 8 carbon atoms and then their hydroxyl termination by methods well known to the art. It should be appreciated that small amounts of alpha olefins such as styrene and acrylonitrile can also be copolymerized with the diolefins and then hydroxylated to give products well known to the art. It should also be appreciated that these hydrocarbon polyols derived from the hydroxyl termination of polyolefins can contain sizeable amounts of unsaturation and that this unsaturation may be reduced, if desired, by appropriate hydrogenation to give fully saturated material. Representative members of this class of materials are the hydroxyl terminated polybutadienes, polyisoprenes and copolymers of butadiene and styrene, copolymers of butadiene acrylonitrile, copolymers of isoprene styrene and copolymers of isoprene acrylonitrile.

The polyester polyols useful in this invention are those well known to the art and in general prepared by the condensation of a glycol with a dicarboxylic acid, either of the alicyclic, aliphatic or aromatic type. Representative of the dicarboxylic acids are the aliphatic acids containing 2 to 10 carbon atoms with specific members being adipic, azelaic, glutaric and related members of this class. The phthalic acids may also be used in making these esters. Generally, the ethylene glycol, propylene glycol, tetramethylene glycol or diethylene glycol is utilized to react with the dicarboxylic acids to produce the desired polyesters. It should be appreciated that mixtures of the acids and glycols may be utilized where improved low temperatures properties of the polyurethane are desired.

The pigments useful in this invention in general belong to the class known as white pigments, as the colored or dark pigments such as carbon black have been found unexpectedly to give poor adhesion bonds when subjected to ASTM test D-1191. One of the cheaper white pigments is calcium carbonate and at 24 parts per hundred parts of reactive hydrogen containing material it is able to pass the ASTM D-1191 test, but it should be appreciated the test permits one failure out of three in the adhesion under test conditions. As the amount of calcium carbonate is increased above 24 parts, usually around 35 parts, sufficient filler has been added that all three samples will pass the adhesion test under the test conditions of ASTM D-1191. In addition to the utilizing of calcium carbonate it has been found desirable to use a mixture of calcium carbonate with zinc oxide and titanium dioxide. Usually the amount of zinc oxide and titanium dioxide used in the mixture is about 0.4 to 1 and 1 to 1.5 respectively for each part of calcium carbonate.

It should be appreciated that the usual tin catalysts or amine catalysts useful in making polyurethane may be utilized to advantage to reduce the gel time of the prepolymer which is utilized as an adhesive to adhere to the concrete or as a sealer.

The nature of this invention may more readily be understood by reference to the representative examples wherein all parts are by weight unless otherwise specified.

EXAMPLE I

The reactive hydrogen containing material (polymer) was weighed in tared 5 gallon cans. The white pigment and antioxidant were then added to the can with stirring. The mixture was allowed to sweat overnight, viz. stand at room temperature, and then run through a three-roll paint mill in a single pass. The loaded polymer was weighed into ice-cream mixers and the catalyst added with a syringe. (An ice-cream mixer was used to mix the recipe because of its ability to give complete mixing.) The polymer and catalyst were mixed for about 10 minutes and stored until used. The organic polyisocyanate was weighed in bottles and stored until used.

The concrete joint was made free of dirt by using a high pressure air line. The isocyanate was added to the white pigmented polymer, mixed for 5 minutes, and poured into the joint. The bubbles were removed with a hot air gun. The liquid rubber was allowed to cure at ambient temperatures, about 60°F. The cure rate can be controlled by the catalyst concentration. This allows the work area to be placed in service within a matter of hours. This concrete joint was a 50 foot section in a concrete floor with concrete slabs spaced about one-fourth to one-half inch apart.

EXAMPLE II

Concrete samples were adhered per the ASTM method D-1191 with the adhesive of Tables 1 and 2 and the test results on these samples likewise are given in Tables 1 and 2 respectively. Instead of the polybutadiene diol of Tables 1 and 2, hydroxyl terminated polybutadiene-acrylonitrile copolymer (85/15%) or hydroxyl terminated polybutadiene-styrene copolymer (75/25%) can be used.

Table 1

| Ingredients | Recipe No. 1 | Recipe No. 2 | Recipe No. 3 |
|---|---|---|---|
| R45-M | 100 | 100 | 100 |
| White Pigment A | 70 | 70 | 70 |
| Hylene W[2] | 9.2 | — | — |
| Isonate 143-L[3] | — | 10.0 | — |
| TDI[4] | — | — | 6.1 |
| DBTDL[5] | 2.0 | 0.025 | 1.75 |
| Physical Properties | | | |
| Tensile psi | 800 | 900 | 500 |
| Elongation % | 325 | 220 | 740 |
| 100% Modulus R.T. | 350 | 490 | 95 |
| 100% Modulus 0°F. | 200 | 150 | 165 |
| ASTM D-1191 Bond Test on 3 specimen: | | | |
| Specimen A | passed 5 cycles | failed 1st cycle | failed 1st cycle |
| Specimen B | passed 5 cycles | failed 1st cycle | failed 1st cycle |
| Specimen C | passed 5 cycles | failed 1st cycle | failed 1st cycle |

[1] - The white pigment A was a mixture of 16 parts zinc oxide, 30 parts titanium dioxide and 24 parts calcium carbonate.
[2] - Hylene W is the trademark for E. I. duPont deNemours & Company's aliphatic diisocyanate.
[3] - Isonate 143-L is the tradename for The Upjohn Company's liquid MDI, i.e. methane di(phenyl isocyanate).
[4] - TDI is 80/20 isomeric mixture of toluene diisocyanate.
[5] - DBTDL is dibutyltin dilaurate catalyst.

Note that the failure of the specimen with Recipes No. 2 and 3 were caused by the adhesive being so inelastic at the test temperature that the concrete failed because the adhesive did not elongate sufficiently. It should be noted the adhesive was satisfactory from a bond standpoint as the failure occurred in the concrete specimen per se.

Table 2

| Ingredients | Recipe Nos. | | | | |
|---|---|---|---|---|---|
| | 4 | 5 | 6 | 7 | 8 |
| R45-M | 100 | 100 | 100 | 100 | 100 |
| White Pigment B | 35 | 35 | 35 | 35 | 35 |
| Nathic[2] | 20 | — | — | — | — |
| Hylene W | 9.2 | 9.2 | — | — | — |
| Isonate 143-L | — | — | 10.0 | — | — |
| Mondur MRS[3] | — | — | — | 9.3 | — |
| TDI | — | — | — | — | 6.1 |
| DBTDL | 1.75 | 1.75 | 0.025 | 0.05 | 1.50 |
| Physical Properties | | | | | |
| Tensile psi | 220 | 400 | 600 | 250 | 420 |
| Elongation % | 630 | 675 | 220 | 225 | 240 |
| 100% Modulus R.T. | 50 | — | 335 | 150 | 230 |
| 100% Modulus 0°F. | 87 | — | 425 | — | 265 |
| ASTM D-1191 Bond Test on 3 specimen: | | | | | |
| Specimen A | passed 5 cycles | failed 3rd cycle | failed 1st cycle | failed 1st cycle | failed 4th cycle |
| Specimen B | passed 5 cycles | passed 5 cycles | failed 1st cycle | failed 1st cycle | failed 3rd cycle |
| Specimen C | passed 5 cycles | failed 1st cycle | failed 1st cycle | failed 1st cycle | passed 5 cycles |

[1] - The white pigment B was a mixture of 8 parts zinc oxide, 15 parts titanium dioxide and 12 parts calcium carbonate.
[2] - Nathic is a hydrocarbon plasticizer.
[3] - Mondur MRS is the tradename for Mobay Chemical Company's polyisocyanate (MDI type).

Table 3

| Ingredients | Recipe No. 9 | Recipe No. 10 |
|---|---|---|
| Polypropylene polyol[1] | 100 | 100 |
| White Pigment A | — | 70 |
| Isonate 143-L | 27.8 | 27.8 |
| DBTDL | 0.015 | 0.015 |
| Physical Properties | | |
| Tensile psi | 275 | 400 |
| Elongation % | 240 | 225 |
| 100% Modulus R.T. | 210 | 240 |
| 100% Modulus 0°F. | — | 270 |
| ASTM D-1191 Bond Test on 3 specimen: | | |
| Specimen A | failed 1st cycle | failed 1st cycle |
| Specimen B | failed 1st cycle | failed 1st cycle |
| Specimen C | failed 1st cycle | failed 1st cycle |

[1] - The polypropylene polyol was an equivalent mixture of polypropylene glycol and polypropylene triol.

It is desired that the ratio of the organic polyisocyanate to reactive hydrogen containing compound be such that the R value is between about 0.8 to 1.2 where the R value is the ratio of NCO groups to OH groups. The best physicals are obtained at about an R value of 1.0.

It should be appreciated that the cure or set can be achieved by heating to 100° to 200°F. or standing exposed to the atmosphere at ambient temperature.

Referring again to Tables 1 and 2, it should be indicated that R45-M is designated for the polybutadiene polyol having a hydroxyl equivalent of 0.70 milliequivalents per gram. Also, when Recipe 5 was repeated using one part of a phenol-type antioxidant and 1.25 parts of diisobutylene-butylene phenol type antioxidant, all three specimens passed 5 cycles of the ASTM D-1191 test at 0°F.

Thus, by using at least 16 parts and sufficient, usually about 20 parts of white pigment and up to 100 parts for each 100 parts of reactive hydrogen containing material, it is possible to provide a sealant which does not fail at 0°F. even though the concrete fails.

Reference to Tables 2 and 3 illustrates the beneficial effect obtained by the use of the white pigments. For instance, all the specimen failures with Recipes 4 to 8 of Table 2 occurred because the concrete failed rather than the bond between the concrete and the sealant or adhesive. Table 3 specifically illustrates this where Recipe 9 is devoid of white pigment and there the failure in the ASTM D-1191 bond test occurred between the concrete and the sealant, whereas on the other hand, in the ASTM bond test with Recipe 10 of Table 3, the failures there occurred when the concrete failed under the test condition.

While certain representative embodiments and details have been shown for the purpose of illustrating the invention, it will be apparent to those skilled in this art that various changes and modifications may be made therein without departing from the spirit or scope of the invention.

What is claimed is:

1. A composition of matter characterized by being capable of meeting the requirements of ASTM method D-1191 and having a modulus at 0°F. of 87 to 425 and comprising the reaction product of a reactive hydrogen containing material of about 1,000 to 6,000 molecular weight selected from the class consisting of polyester polyols of glycols and dicarboxylic acids, polyether polyols and hydrocarbon polyols, an organic polyisocyanate having a functionality of about 2 to 3 and at least 24 parts and sufficient, but no more than 100 parts of white pigment for each 100 parts of reactive hydrogen containing material, said white pigment being selected from the class of calcium carbonate and a mixture of calcium carbonate, titanium dioxide and zinc oxide.

2. A concrete surface having adhered thereto a polyurethane composition comprising the reaction product of a reactive hydrogen containing material of about 1,000 to 6,000 molecular weight selected from the class consisting of polyester polyols, polyether polyols and hydrocarbon polyols, an organic polyisocyanate having a functionality of about 2 to 3 and at least 16 parts and sufficient but no more than 100 parts of white pigment for each 100 parts of reactive hydrogen containing material, said white pigment being selected from the class of calcium carbonate and a mixture of calcium carbonate, titanium dioxide and zinc oxide.

3. A method of sealing concrete surfaces comprising cleaning the surface of the concrete and applying a mixture of a reactive hydrogen containing material of about 1,000 to 6,000 molecular weight selected from the class consisting of polyester polyols, polyether polyols and hydrocarbon polyols, an organic polyisocyanate having a functionality of about 2 to 3 and at least 16 parts and sufficient but no more than 100 parts of white pigment for each 100 parts of reactive hydrogen containing material, said white pigment being selected from the class of calcium carbonate and a mixture of calcium carbonate, titanium dioxide and zinc oxide, and setting the mixture while exposed to the atmosphere.

* * * * *